United States Patent [19]

Rood

[11] Patent Number: 4,715,733

[45] Date of Patent: Dec. 29, 1987

[54] ANTIFRICTION THRUST BEARING FOR ORBITAL MOTION

[75] Inventor: Jerry A. Rood, Onalaska, Wis.

[73] Assignee: American Standard Inc., New York, N.Y.

[21] Appl. No.: 865,494

[22] Filed: May 21, 1986

[51] Int. Cl.[4] .................. F16C 19/00; F01C 1/02; F16H 37/00

[52] U.S. Cl. ............................ 384/445; 74/86; 418/55

[58] Field of Search .............. 384/2, 50, 627, 91, 384/445, 548, 590, 593, 597, 604, 618, 619; 464/102, 103; 74/86; 241/207; 418/55

[56] References Cited

U.S. PATENT DOCUMENTS

| | | | |
|---|---|---|---|
| 9,912 | 8/1853 | Parry . | |
| 369,233 | 8/1887 | Coxe et al. | 74/86 |
| 380,190 | 3/1888 | Coxe et al. | 74/86 X |
| 419,035 | 1/1890 | Coxe et al. | 74/86 |
| 419,036 | 1/1890 | Coxe et al. | 74/86 |
| 419,037 | 1/1890 | Coxe | 74/86 |
| 419,089 | 1/1890 | Wagner | 74/86 |
| 630,581 | 8/1899 | Belanger . | |
| 651,331 | 6/1900 | Holmes . | |
| 890,729 | 6/1908 | Transue . | |
| 1,165,432 | 12/1915 | Michaud . | |
| 2,273,895 | 2/1942 | Roterberg . | |
| 2,826,053 | 3/1958 | Munn | 464/103 |
| 4,259,043 | 3/1981 | Hidden et al. | 418/55 |
| 4,468,181 | 8/1984 | Sakamoto | 418/55 |

*Primary Examiner*—Stuart S. Levy
*Assistant Examiner*—Thomas R. Hannon
*Attorney, Agent, or Firm*—William J. Beres; Robert J. Harter; Carl M. Lewis

[57] ABSTRACT

A thrust bearing for use between two parallel plates in relative orbital motion. The bearing includes a plurality of rollers disposed between the plates. Each roller comprises two opposing cones joined at their base with one cone in rolling line contact with one plate and the other cone in rolling line contact with the other plate. As one plate orbits relative to the other, each rolling line contact sweeps a circular area on its respective plate.

14 Claims, 15 Drawing Figures

ANTIFRICTION THRUST BEARING FOR ORBITAL MOTION

TECHNICAL FIELD

This invention generally pertains to a roller thrust bearing and specifically to a roller thrust bearing interposed between two opposed surfaces in orbital motion relative to each other.

BACKGROUND OF THE INVENTION

A plurality of rolling balls interposed between two surfaces is frequently used as an antifriction thrust bearing to enable relative orbital motion of the structures comprising each surface. The balls transmit the axial or thrust load from one surface to the other, while the rolling action of the balls allow substantially frictionless radial or orbital movement of one surface with respect to the other. Such bearings are particularly useful in machines undergoing an axial thrust while moving in an orbital motion, such as the scroll plates in a scroll compressor. When the ball bearings are constrained to roll within circular pockets, they can maintain a fixed angular relationship between the orbiting plates or between an orbiting plate and a frame. An example of this is disclosed in U.S. Pat. No. 4,468,181.

As an improvement over rolling balls in the scroll machine thrust bearing application, U.S. Pat. No. 4,259,043 discloses cylindrical rollers for providing a line versus a point contact for greater load carrying capacity per roller. This requires two sets of rollers separately disposed in two planes which are parallel to the moving surfaces. Aligning the rotational axis of the rollers in one plane perpendicular to those in the other plane enables two-dimensional movement of the surfaces in any direction parallel to the surfaces. With the rollers being disposed in two planes, however, an additional pair of bearing races are required, which increases the complexity and cost of the bearing.

Therefore, it is an object of this invention to provide an antifriction thrust bearing for orbital motion, wherein the rollers are disposed in one plane and the thrust is supported by a plurality of rolling line contacts.

Another object is to provide an antifriction thrust bearing that requires fewer rollers than if spherical or cylindrical rollers were used.

Another object is to provide a roller for an orbital motion thrust bearing, wherein said roller comprises two opposing cones which are coaxially aligned and joined at their base.

Another object is to provide an opposing cone roller thrust bearing for use between two parallel surfaces that allow their relative orbital motion but prevents rotational motion of the surfaces relative to each other, maintaining their fixed angular relationship.

These and other objects will be apparent from the attached drawings and the description of the preferred embodiments that follow below.

DISCLOSURE OF THE INVENTION

The subject invention is an antifriction thrust bearing that includes two parallel plates in relative oribtal motion which are separated by rollers disposed therebetween. Each roller comprises two opposing cones that are coaxially aligned and joined at their base. One cone of each roller rolls in line contact on one plate and its opposing cone rolls in line contact on the other plate. As one plate orbits relative to the other, each rolling line contact sweeps a circular area on its respective plate.

DESCRIPTION OF THE PREFERRED EMBODIMENTS

Figure 1:
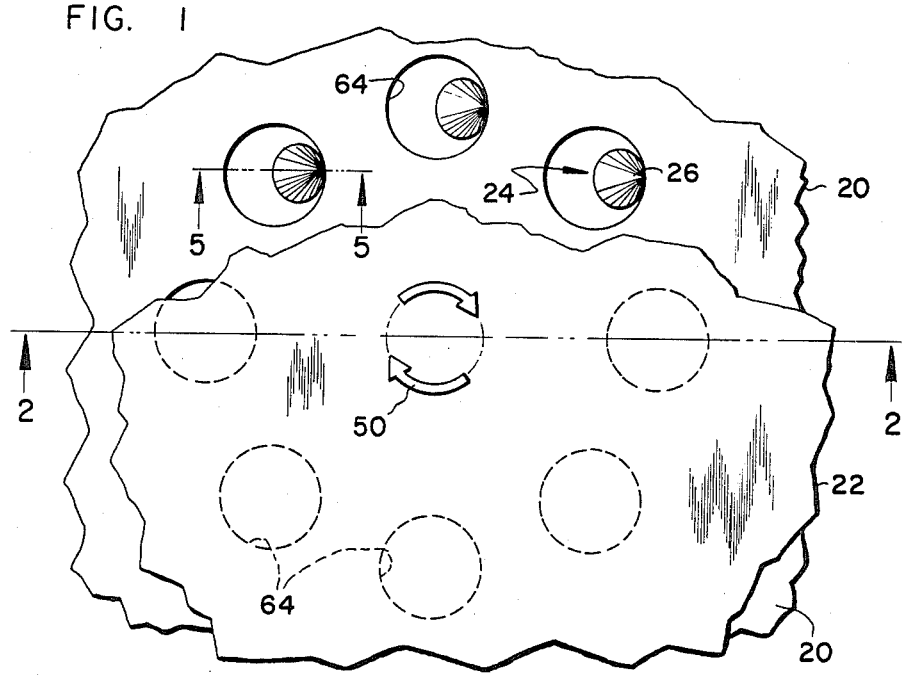
FIG. 1 shows a cutaway top view of one embodiment of the invention.
Figure 2:
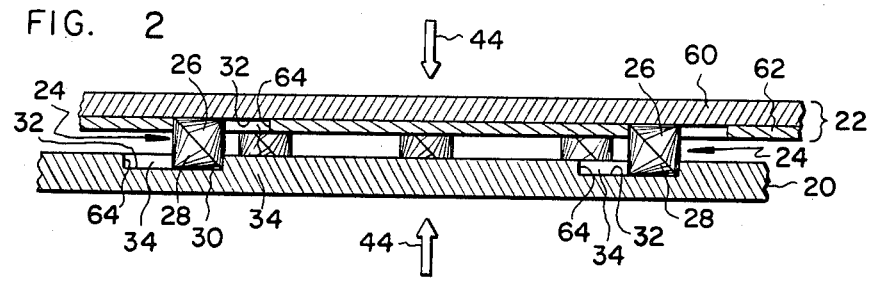
FIG. 2 shows a cross-sectional view of FIG. 1 taken along line 2—2.

A first preferred embodiment of the subject invention is shown in FIGS. 1 and 2. A plurality of rollers 24 is interposed between two parallel plates 20 and 22 which are in relative orbital motion. Each roller 24 comprises two opposing cones 26 and 28. Upper cone 26 and lower cone 28 are coaxially aligned and joined at their base 30.

Figure 3:
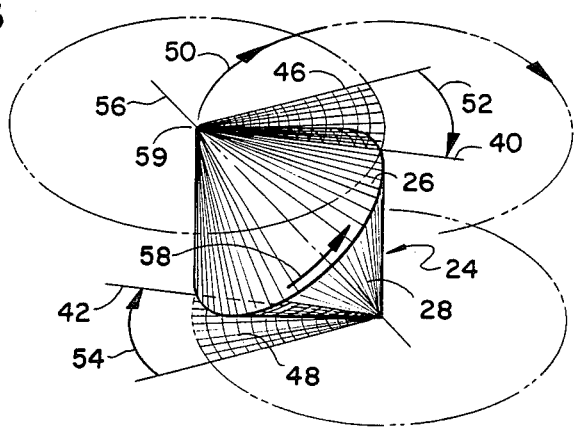
FIG. 3 shows a perspective view of a roller included in the subject invention.

With reference to FIG. 3, upper cones 26 are in contact along a line 40 with bearing races 32 of upper plate 22, while lower cones 28 are in contact along a line 42 with bearing races 32 of lower plate 20. Axial thrust applied to plates 20 and 22 in the direction shown by arrows 44 is distributed across these line contacts 40 and 42. In addition, as upper plate 22 orbits relative to lower plate 20, each of the line contacts 40 and 42 sweep through an arc to define circular areas 46 and 48 in their respective race 32.

Figure 4:
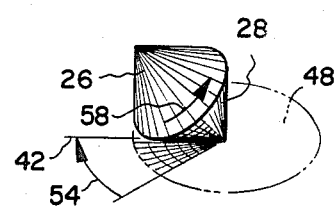
FIG. 4 is another perspective view of a roller included in the subject invention.

The relative motion of the bearing elements are more clearly shown in FIGS. 3 and 4. As upper plate 22 orbits relative to lower plate 20 in the direction of arrow 50, upper rolling line contact 40 sweeps a circular area 46 in the direction of arrow 52, and lower rolling line contact 42 sweeps a circular area 48 in the direction of arrow 54. As rollers 24 roll within their respective races 32 (FIG. 2), each roller 24 rotates about its axis of rotation 56 as shown by arrow 58, and the apex 59 of each upper cone 26 orbits in the direction of arrow 50. Although only one roller 24 is shown in FIGS. 3 and 4, each of the rollers 24 move similarly within their respective races 32.

Referring to FIG. 2, rollers 24 are held within pockets 34 which are created by bearing races 32 being recessed into plates 20 and 22. Pockets 34 can be either integrally formed into these plates as in plate 20, or formed as an assembly as in plate 22. Plate 22 comprises back plate 60 and retaining plate 62 which is attached thereto. Plate 62 includes at least three pocket forming holes equally spaced in a circular pattern, wherein sidewall 64 of each hole defines the perimeter of each race 32.

Rollers 24, being trapped within pockets 34, prevent relative angular rotation of plates 20 and 22 when the path of plate 20 relative to plate 22 is constrained to a circular orbital path similar to that which is generally designated by arrow 50 in FIGS. 1 and 3.

Figure 5:
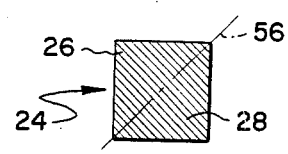
FIG. 5 is a cross-sectional view of the roller in FIG. 4 taken along its axis of rotation.
Figure 6:
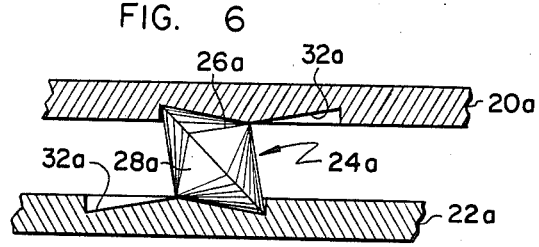
FIG. 6 is a view of a roller having an axial length that is less than its diameter.
Figure 7:
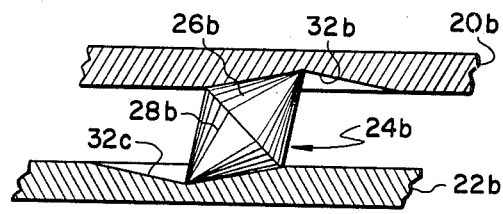
FIG. 7 is a view of a roller having an axial length that is greater than its diameter.

The cross-sectional area of roller 24, as shown in FIG. 5, is generally a square profile as a result of its cones 26 and 28 assuming the shape of conical surfaces generated by rotating an equilateral right triangle about one of its sides. However, several alternative roller profiles with appropriately matching bearing races can also be used. Examples of these are illustrated in FIGS. 6 through 12. FIG. 6 shows roller 24a with an axial length that is less than the base diameter of cones 26a and 28a. Roller 24a, interposed between plates 20a and 22a, is in rolling line contact with races 32a. FIG. 7 shows roller 24b with an axial length that is greater than the base diameter of cones 26b and 28b. Roller 24b is interposed between plates 20b and 22b and is in rolling line contact with races 32b and 32c.

Figure 8:
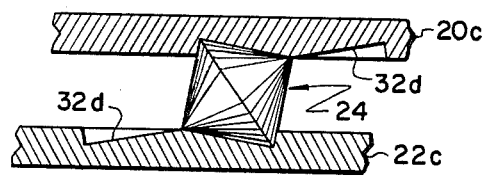
FIG. 8 is a view of a roller having a substantially square cross section and interposed between two generally convex bearing races.
Figure 9:
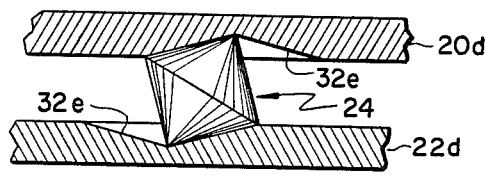
FIG. 9 is a view of roller having a substantially square cross section and interposed between two generally concave bearing races.
Figure 10:
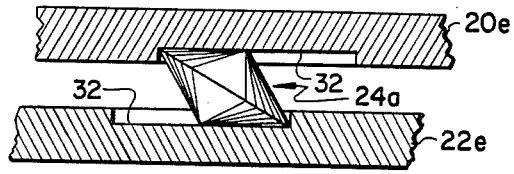
FIG. 10 shows another roller having an axial length that is less than its diameter.
Figure 11:
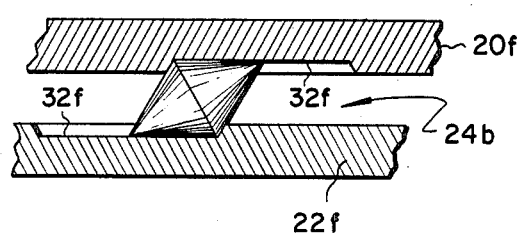
FIG. 11 shows another roller having an axial length that is greater than its diameter.

Roller 24 has a square cross section and is shown in FIG. 8 interposed between plates 20c and 22c. Roller 24 is in rolling line contact with races 32d each of which define a convex conical shape with its apex directed toward the apex of the other. FIG. 9 shows roller 24 interposed between plates 20d and 22d, in rolling line contact with races 32e, each of which define a concave conical shape with its apex directed away from the apex of the other. FIG. 10 illustrates that roller 24a of FIG. 6 can also roll within flat races 32 which are recessed into plates 20e and 22e. Similarly, FIG. 11 illustrates that roller 24b of FIG. 7 can roll within flat races 32f which are recessed into plates 20f and 22f.

Figure 12:
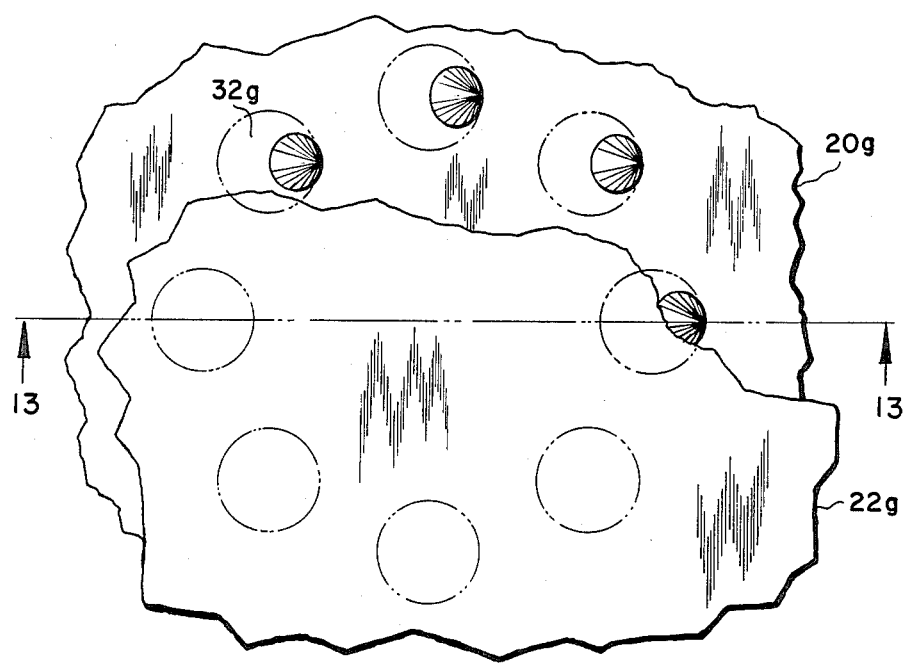
FIG. 12 is a cutaway top view of a plurality of rollers interposed between two orbiting plates.
Figure 13:
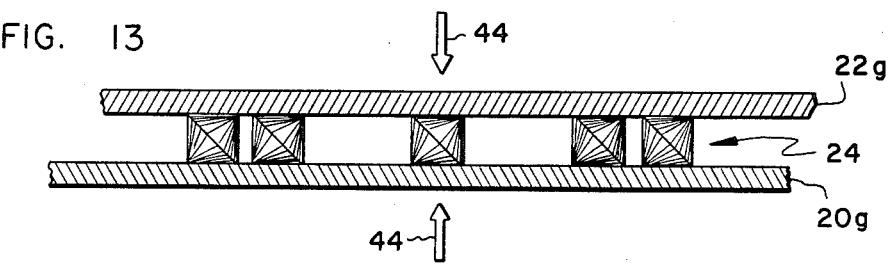
FIG. 13 is a cross-sectional view of FIG. 12 taken along line 14—14.

FIGS. 12 and 13 illustrate a further embodiment, wherein races 32g are in coplanar alignment with the facing surfaces of plate 20g and 22g. Although bearings of this design are effective in enabling orbital motion while supporting thrust 44, their effectiveness in preventing relative rotation of plates 20g and 22g is limited. Without pockets 34 constraining rollers 24, only the frictional force along the length of rolling line contacts 40 and 42 of FIG. 3 act to impede the angular rotation of plate 20g relative to plate 22g.

Figure 14:
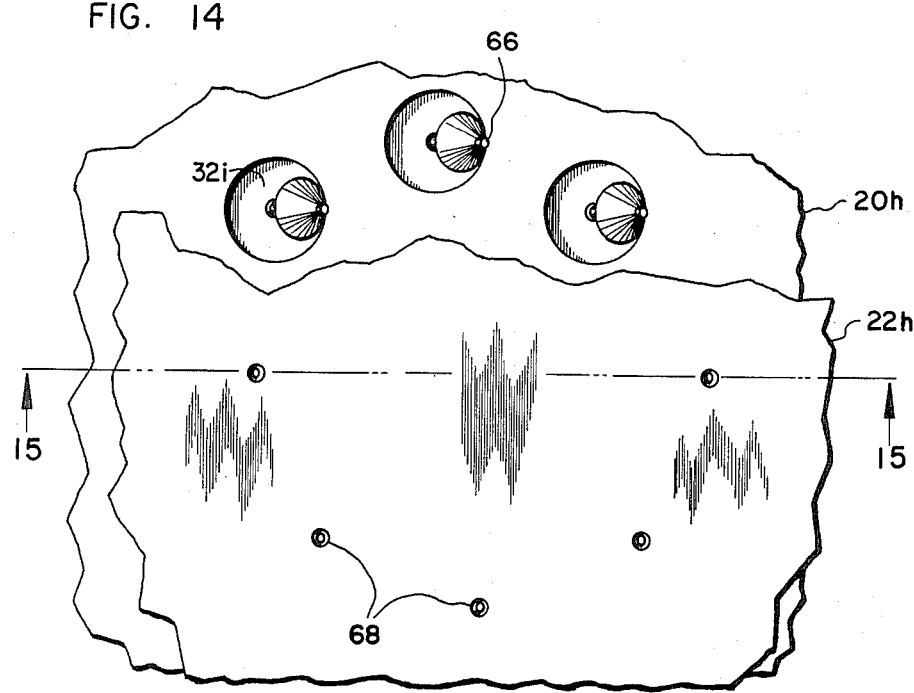
FIG. 14 is a cutaway top view of another embodiment of the invention.
Figure 15:
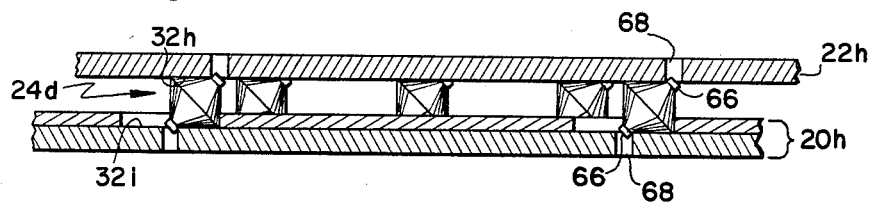
FIG. 15 is a cross-sectional view of FIG. 15 taken along line 16—16.

FIGS. 14 and 15 illustrate yet another embodiment with bearing races 32i recessed into plate 20h and with races 32h in coplanar alignment with the facing surface of plate 22h. More importantly though, this embodiment includes alignment nibs 66 which extend outwardly in an axial direction from the apex 59 (FIG. 3) of each cone 24d. Nibs 66 extend into alignment holes 68 which are located at the center of bearing races 32h and 32i, whereby the apex 59 of each cone 24d is held to the center of its respective races 32h and 32i. Inserting nibs 66 into alignment holes 68 assures proper positioning of rollers 24d within their races 32h and 32i during assembly. Although FIGS. 14 and 15 illustrate nibs which are cylindrically shaped, it should be appreciated that a wide variety of alternative shapes would also work such as conical or spherical. It should also be noted that nibs 66 and alignment holes 68 could also be adapted for use with other roller and bearing race configurations, such as those shown in FIGS. 1 through 12.

Although this invention is described with respect to several embodiments, modifications thereto will become apparent to those skilled in the art. Therefore, the scope of this invention is to be determined by reference to the claims which follow.

I claim:

1. An antifriction thrust bearing for use between two generally facing surfaces undergoing relative orbital motion, said bearing comprising a plurality of rollers each having two opposing, generally conical shaped surfaces defined by two coaxially aligned cones, joined at their base, and each having an apex at opposite ends of each of said rollers with each apex having a vertex angle that is less than or generally equal to a right angle of 90 degrees, and with each conical surface lying in rolling line contact with one of the facing surfaces, so that said rolling line contact sweeps a circular area on each of said facing surfaces as they orbit relative to each other.

2. The thrust bearing as recited in claim 1, wherein an alignment hole is located near the center of each of said circular areas and wherein an alignment nib extends coaxially from the apex of each of said conical shaped surfaces and is adapted to extend into one of said alignment holes.

3. The thrust bearing as recited in claim 1, wherein said circular areas are recessed into at least one of said facing surfaces.

4. The thrust bearing as recited in claim 3, wherein at least one of said circular areas is recessed into both said facing surfaces to form opposed pockets which contain one of said rollers and which function together to couple said facing surfaces in a fixed angular relationship.

5. The thrust bearing as recited in claim 1, wherein said conical shaped surfaces assume the shape of a surface generated by rotating an equilateral right triangle about one of its sides.

6. The thrust bearing as recited in claim 1, wherein at least one of said circular areas has a concave conical shape.

7. The thrust bearing as recited in claim 1, wherein at least one of said circular areas has a convex conical shape.

8. The thrust bearing as recited in claim 1, wherein the axial length of at least one of said rollers is greater than the diameter thereof.

9. An antifriction thrust bearing for orbital motion, comprising:
   a. a first plate having a plurality of generally circular races disposed thereon;
   b. a second plate generally parallel to said first plate and having a plurality of generally circular races corresponding to said plurality of races on said first plate in one-to-one correspondence, wherein said races on said first plate face generally toward said races on said second plate; and
   c. a plurality of rollers each including two opposing cones which are axially aligned and share a common circular base, wherein an axial cross section of said rollers includes an axis of rotation of said roller and has a generally square profile with said axis of rotation as a diagonal thereof, and wherein each of said plurality of rollers is interposed between corresponding races of said first and second plates such that one opposing cone of each of said rollers rolls on said races of said first plate and the other opposing cone of each of said rollers rolls on said races of said second plate as said plates orbit relative to each other.

10. The thrust bearing as recited in claim 9, wherein an alignment hole is located near the center of each of said generally circular races and wherein an alignment nib extends coaxially from an apex of each of said cones and is adapted to extend into one of said alignment holes.

11. The thrust bearing as recited in claim 9, wherein said plurality of races are recessed into at least one of said plates.

12. The thrust bearing as recited in claim 9, wherein said races are recessed into both of said plates to form pockets which contain said rollers and together function to couple said plates in a fixed angular relationship.

13. The thrust bearing as recited in claim 9, wherein at least one of said races has a concave conical shape.

14. The thrust bearing as recited in claim 9, wherein at least one of said races has a convex conical shape.

* * * * *